United States Patent [19]

Kley

[11] 4,178,481

[45] * Dec. 11, 1979

[54] ELECTRICAL DATA ENTRY DEVICES

[76] Inventor: Victor B. Kley, 2212 Byron St., Berkeley, Calif. 94702

[*] Notice: The portion of the term of this patent subsequent to Mar. 14, 1995, has been disclaimed.

[21] Appl. No.: 867,516

[22] Filed: Jan. 6, 1978

Related U.S. Application Data

[63] Continuation-in-part of Ser. No. 712,748, Aug. 9, 1976, Pat. No. 4,079,194.

[51] Int. Cl.² ............................................. G08C 21/00
[52] U.S. Cl. ................................................... 178/18
[58] Field of Search .......................... 178/18, 19, 20; 340/146.3 SY, 365 S, 365 C, 365 A

[56] References Cited

U.S. PATENT DOCUMENTS

| | | | |
|---|---|---|---|
| 3,379,835 | 4/1968 | Gilbert | 178/18 |
| 3,590,158 | 6/1971 | Pabst | 178/18 |
| 3,705,956 | 12/1972 | Dertouzos | 178/18 |
| 3,819,857 | 6/1974 | Inokuchi | 178/19 |
| 4,029,899 | 6/1977 | Gordon | 178/19 |
| 4,079,194 | 3/1978 | Kley | 178/18 |

*Primary Examiner*—Thomas A. Robinson
*Attorney, Agent, or Firm*—O'Brien and Marks

[57] ABSTRACT

Planar resistive connecting means for the edges of a rectangular resistive graphic area has a higher effective resistance parallel to the edges of the resistive graphic area than that of the resistive graphic area. This higher effective resistance is formed by means of configuring the connecting areas such as by forming outer edges at acute angles with the edges of the resistive graphic area or by forming slits transverse to the edges of the resistive graphic area. There is also disclosed a combination of a resistive graphic area surrounded by a plurality of planar conductors forming multi-bit digital switching facilities operated by a common conductive plane.

9 Claims, 6 Drawing Figures

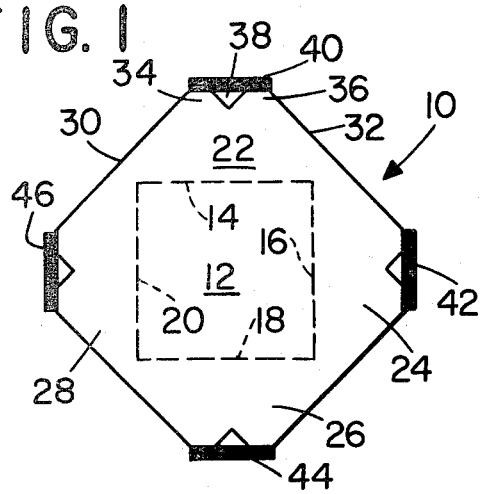
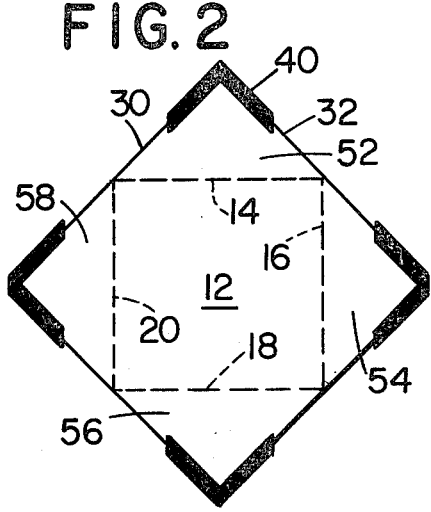
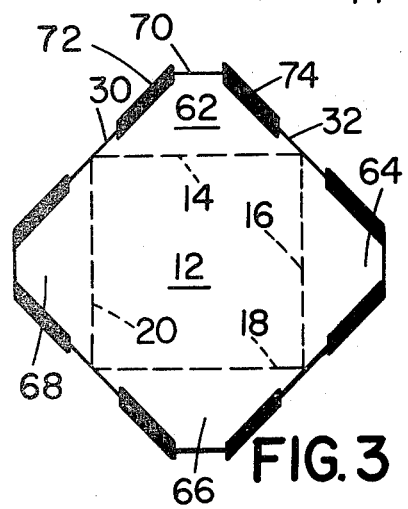
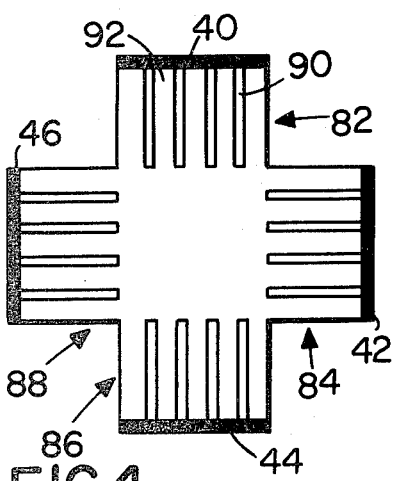
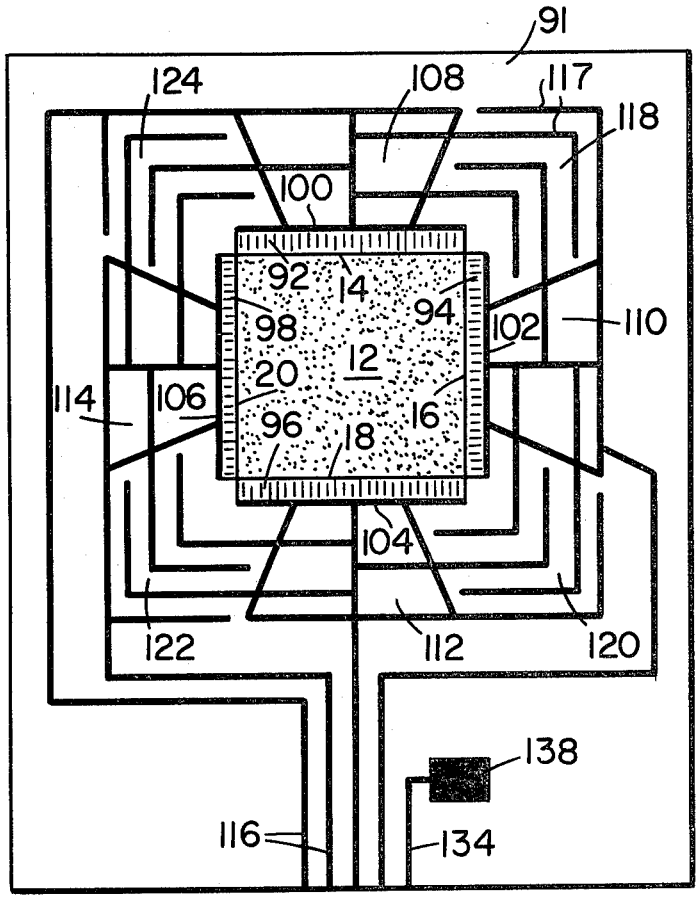
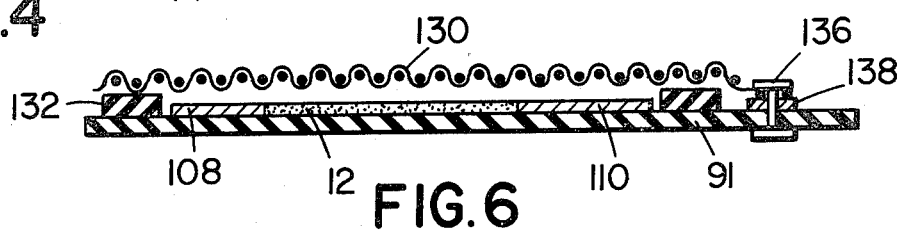

ELECTRICAL DATA ENTRY DEVICES

CROSS REFERENCE TO RELATED APPLICATION

This application is a continuation-in-part of my copending application Ser. No. 712,748 filed Aug. 9, 1976 for Graphical Data Entry Pad (now U.S. Pat. No. 4,079,194 issued Mar. 14, 1978) which is incorporated herein by reference.

BACKGROUND OF THE INVENTION

This invention relates to data entry devices for entering graphical data into data processing or communication systems; and more particularly, to such devices employing rectangular resistive planes useable with contact probes, capacitance probes, parallel conductive planes, etc. and for generating electrical analog signals.

In my previous copending application Ser. No. 712,748 there is disclosed planar resistive entry devices having a rectangular grid or graphical area of resistance connected by planar resistance means at the respective edges of the rectangular grid area to four connecting means wherein the planar resistive means has an effective resistance parallel to the edges of the resistive grid area substantially higher than that of the resistive grid area; these planar resistive connecting means provide a buffer tending to isolate the connecting means from the resistive grid area to reduce shunting of the edges of the resistive grid area and thus produce increased linearity within the rectangular grid area.

Also there is disclosed in my prior copending application the combination of a layer of resistance material in a grid or graphic area with a pair of closely spaced planar connector runs formed on the same insulated member spaced from the resistive area but parallel a common layer so as to form both a switch device and an analog graphical data device operated by the common conductive layer.

SUMMARY OF THE INVENTION

In one aspect of the invention, planar resistive means connecting respective conductors to respective edges of a rectangular resistive graphic area are configured to produce substantially increased resistance in such planar resistive connecting means parallel to the respective edges of the rectangular graphic area.

In another aspect of the invention there is provided a plurality of conductor patterns upon a substrate along with a resistive graphic area adjoining the plurality of conductor patterns wherein the conductor patterns include both single conductors for cooperating with an overlying conductive plane to form single-bit digital entry areas and fingers of adjacent conductors closely interlaced to form multiple-bit digit areas.

An object of the present invention is to construct a graphical data entry device using a uniform resistive rectangular area in which voltage values are substantially linear.

Another object of the invention is to substantially reduce cost in the manufacture of graphical entry devices.

Yet another object of the invention is to construct a data entry device which both generates analog signals as well as multiple bit digital signals with a minimum cost.

Other objects, advantages and features of the present invention will be apparent from the following description of the preferred embodiments taken in conjunction with the accompanying drawings.

BRIEF DESCRIPTION OF THE DRAWINGS

FIG. 1 is a plan view of a resistive graphical entry device in accordance with the present invention.

FIG. 2 is a plan view of a variation of the graphical entry device of FIG. 1.

FIG. 3 is a plan view of another variation of the graphical entry device of FIG. 1.

FIG. 4 is a plan view of still another variation of the graphical entry device of FIG. 1.

FIG. 5 is a plan view of a base member of an entry device suitable for generating both analog signals and multiple-bit digital signals.

FIG. 6 is a cross section of an entry device employing the base member shown in FIG. 5.

DESCRIPTION OF THE PREFERRED EMBODIMENTS

As illustrated in FIG. 1, an embodiment of the invention includes a resistance sheet or layer indicated generally at 10 which includes a central rectangular resistance graphic or grid area 12 having four edges indicated by the four dashed lines 14, 16, 18 and 20 integrally connected with respective resistance connecting portions 22, 24, 26 and 28. The resistance connecting portion 22 has outer edges 30 and 32 which extend at acute angles to the edge 14 of the rectangular area 12. The edges 30 and 32 converge toward each other and terminate at respective points or tips 34 and 36 which are separated by a V-shaped notch or cutout 38 in the connecting resistive portion 22. A conductor 40 is attached or electrically connected to both of the points 34 and 36. Similar conductors 42, 44, and 46 are connected to the points of the respective resistance connection portion 24, 26, and 28 which also have outer edges forming acute angles with the respective edges 16, 18 and 20 of the rectangular area 12.

The resistive sheet 10, including the areas 12, 22, 24, 26 and 28, may be any sheet of planar resistance material, or may be a uniform layer of resistance material applied to a substrate such as thermoplastic, glass, paper, or other insulative material. Where the resistance sheet 10 includes a substrate, the resistance layer may cover one entire surface of the substrate or may cover only a portion of one surface of the substrate. The resistance material may be a resistive ink or the like deposited on such substrate. Further the entire graphical entry device may be formed from clear materials including clear resistive and conductive materials so that it may be placed over a light transmitting device such as a television tube or cathode ray tube.

In use of the resistance sheet 10 the portions 22, 24, 26, and 28 may be folded underneath and connected to a suitable electronic circuit. Voltages or voltage pulses are alternately applied across conductors 38 and 44 and then across conductors 42 and 46 by the electronic circuitry. Graphical data is generated by contacting a selected point of the resistance graphic area 12 with a contact probe or a capacitance probe, by depressing a point of conductive flexible sheet overlying the rectangular area 12, or by any other conventional technique.

A variation of the graphical entry device is shown in FIG. 2 wherein the same numerals are used to indicate similar parts having similar functions and/or structure. In the variation of the FIG. 2 resistive connecting portions 52, 54, 56 and 58 of triangular configuration replace the connecting portions 22, 24, 26 and 28 of the embodiment in FIG. 1. These triangular portions 52, 54, 56, and 58 still have the outer edges 30 and 32 which are formed at an acute angle with the respective edges 14, 16, 18 and 20 of the rectangular center portion 12 but do not contain the two points on each resistive connection portion. The conductors 40, 42, 44 and 46 are applied directly to the outer corner of the triangular sections 52, 54, 56 and 58.

In still another variation illustrated in FIG. 3, resistive connecting portions 62, 64, 66 and 68 replace the connecting portions 22, 24, 26 and 28 of FIG. 1. In the connecting portion 62, opposite outer edges 30 and 32 terminate at the opposite ends of straight edge 70 extending parallel the edge 14. Conductors 72 and 74 are attached to the ends of the edges 30 and 32 adjacent to the edge 70 on the resistive portion 62. Similar conductors are applied to the resistive connecting portion 64, 66 and 68 which have configurations similar to portion 62. In using the resistive sheet of FIG. 3, the conductors 72 and 74 will be both connected to the same terminal or input of an electronic apparatus by conventional means. In FIG. 4, there is illustrated still another variation wherein resistive connecting portions indicated generally at 82, 84, 86 and 88 each have a plurality of slits 90 extending transverse or perpendicular to the respective edges 14, 16, 18, and 20 to thus form narrow fingers 92 of resistive material in the resistive connecting portions 82, 84, 86 and 88 extending from the respective edges 14 to the conductors 40, 42, 44 and 46. The fingers 92 may be formed in making the resistive layer or may be formed by later removal of material to form the slots 90. One particular process in a clear device of indium tin oxide deposited on glass includes forming the slots 90 by vaporizing with a laser beam of a radiation frequency absorbed in indium tin oxide.

In graphical resistance entry devices, voltages are applied first across one set of opposite edges, such as edges 14 and 18, and then to the other set of opposite edges such as edges 16 and 20. During these applications of voltages, the analog values or magnitudes of voltages generated on a contact probe, capacitance probe, or depressed portion of a conductor sheet overlying the resistance pad are sensed to determine the two dimensional position of the probe or depressed portion. These analog values are then utilized in the electronic circuitry connected to the resistance pad.

In the prior art, conductors were connected to the edges of a rectangular graphic area to apply the voltages across such area; however, these conductors resulted in shunting of edge portions of the rectangular resistance area; for example if conductors were directly connected to edges 14, 16, 18 and 20 and if voltage were applied across edges 14 and 18, then the conductors on edges 16 and 20 would shunt the voltage gradient in the portions of resistance within the rectangular area 12 adjacent to such edge portions 16 and 20. This prior art results in substantial non-linearity of the voltage within the rectangular area 12 producing errors in reading the voltage or graphical data being entered. In my prior application Ser. No. 712,748, the linearity in the readout of the rectangular graphical area is substantially improved by interposing resistance areas between the connectors or conductors and the edges of the rectangular graphical area wherein the interposed resistance areas have a higher effective resistance parallel the edges of the graphic area than the graphic area itself.

The embodiments of FIGS. 1, 2, 3 and 4 provide a parallel high effective resistance connection on the edges 14, 16, 18 and 20 without requiring such higher effective resistance being formed by a material having a higher resistivity; rather the higher effective resistance is formed by the configuration of the resistive connecting portions which may be formed of the same uniform material in the rectangular graphic area. Thus there is not required a separate step of depositing a separate resistance material. In FIGS. 1-3, the configuration of edges 30 and 32 being formed at acute angles with the edge 14 results in the respective resistive connecting portions 22, 52 and 62 having an effective resistance parallel to the edge 14 which is substantially higher than the resistance of the area 12. The configurations of the other resistive connecting portions 24, 26, 28, 54, 56, 58, 64, 66 and 68 similarly result in an effective higher parallel resistance. In FIG. 4 the configuration with slots 90 in the resistive connecting portions 82, 84, 86 and 88 transverse to the respective edges 14, 16, 18 and 20 of the rectangular result in the resistive connecting portions 82, 84, 86 and 88 having effective resistances parallel the respective edges 14, 16, 18 and 20 which are substantially greater than the resistance of the rectangular area 12. Thus increased linearity of the voltage gradient in the resistive graphic area 12 is made possible at lesser cost inasmuch as forming the resistive connecting portions with selected configurations is substantially less expensive than prior art techniques of producing linearily in rectangular resistive graphic devices.

In FIGS. 5 and 6 there is illustrated a data entry device including an insulative rigid substrate 91 upon which is deposited a rectangular resistive graphic entry area 12 having edges 14, 16, 18 and 20 joined by resistive connecting portions 92, 94, 96, and 98 to respective conductors 100, 102, 104 and 106. The resistive connecting portions 92, 94, 96 and 98 are formed to have a substantially higher resistivity parallel to the respective edges 14, 16, 18 and 20 to result in increased linearity in voltage gradients generated within the rectangular area 12. The conductors 100, 102, 104 and 106 are portions of conductive patterns 108, 110, 112 and 114 disposed on opposite sides of the resistive entry portion to form single-bit generating areas which are joined to respective terminals 116 on the edge of the substrate 91. Between each of the areas 108 and 110, fingers 117 connected to the respective adjacent conductive patterns 108 and 110 are interlaced in closely spaced relationship so as to form a double-bit entry area 118. Similar double-bit entry areas 120, 122 and 124 are formed between pairs of areas 110-112, 112-114 and 114-108. A flexible upper conductive member such as conductive screen 130 is mounted to extend above the resistive grid area 12 as well as the conductor bit areas 108, 110, 112, 114, 116, 118, 120, 122 and 124. The conductive sheet or layer 130 is mounted on a suitable spacer 132 by suitable means such as rivets, screws, adhesive or other fastening techniques. Also the conductive flexible upper member 130 is joined to a terminal 134 on the substrate 91 by means of a fastener such as rivet 136 securing the screen against a conductor 138 which is joined to the terminal 134.

In operation of the data entry device illustrated in FIGS. 5 and 6, selective depression of the flexible upper member 130 engages the flexible upper member 130 with a selected point within the graphical entry pad 12 or with any of the conductive patterns 108, 110, 112, 114, 118, 120, 122 and 124. Various pulses or voltages are applied by electronic circuitry to the terminals 116 and 134 to selectively read analog data from the resistive grid area 12 and to read digital data from the areas 108, 110, 112, 114, 120, 122, and 124. For example, depressing the member 130 over the area 108 electrically connects the conductive member 130 with one of the terminals 116 which can be sensed by current through member 130 and the connected terminal as a single positive bit, and depressing the member 130 over the area 118 electrically connects the member 130 to two of the terminals 116 which can be sensed by current through the member 130 and the two parallel connected terminals as two positive bits. Thus there is provided a new and improved combination analog and digital data generator. The device shown in FIGS. 5 and 6 eliminates the need for separate digital input and analog graphical input devices.

Inasmuch as the present invention is subject to many variations, modifications, and changes in detail, it is intended that all matter in the foregoing specification or in the accompanying drawings be interpreted in an illustrative and not in a limiting sense.

What is claimed is:

1. A graphical entry device comprising
   a planar resistive sheet having a rectangular resistive graphic area with four edges and four resistive connecting means formed along and connected with the respective edges of the rectangular resistive graphic area,
   four electrically conducting means joined to the respective four resistive connecting means and spaced from the resistive graphic area for connecting to external circuitry, and
   said four resistive connecting means each being configured to have an effective resistance parallel to the respective edges of the rectangular graphic area substantially higher than that of the graphic area.

2. A graphical entry device as claimed in claim 1 wherein each of the four resistive connecting means have two outer edges forming acute angles with the respective edges of the rectangular graphic area.

3. A graphical entry device as claimed in claim 2 wherein the two outer edges of each resistive connecting portion terminate at points spaced from each other.

4. A graphical entry device as claimed in claim 3 wherein each resistive connecting means has a cutout between the two termination points, and said two termination points are electrically connected by conductive means.

5. A graphical entry device as claimed in claim 2 wherein each of the four planar resistive means is triangular in configuration and each conductive means is joined to the outer point of the respective triangular configuration.

6. A graphical entry device as claimed in claim 1 wherein the four resistive connecting means have slits formed therein extending transverse to the respective edges of the rectangular graphic area to thus form increased resistivity in the resistive connecting means parallel to the edges of the rectangular graphic area.

7. A graphic entry device as claimed in claim 6 wherein there are formed a plurality of slits within each of the four resistive connecting means transverse to the respective edges of the rectangular graphic area.

8. A graphic entry device as claimed in claim 7 wherein the slits are substantially perpendicular to the respective edges of the rectangular graphic area.

9. A graphical and digital data entry device comprising
   a flexible planar member,
   a rigid planar member disposed parallel to but spaced from the flexible member such that depression can cause the flexible member to touch the rigid member,
   one of the flexible member and rigid member being conductive,
   a resistive layer disposed on the other of the flexible member and rigid member, said layer of resistive material being disposed in a rectangular pattern so as to form a graphic area for graphical data,
   a plurality of conductor patterns adjacent the graphic area,
   said conductor patterns defining first areas wherein only single conductors of said conductor patterns are exposed for engagement with the one member, and
   said conductor patterns also defining second areas between respective pairs of first areas wherein closely spaced fingers of the respective adjacent single conductors are interlaced so that depression of the flexible member at the second areas brings about engagement between the one member and both respective adjacent single conductors.

* * * * *